(12) United States Patent
Nagai et al.

(10) Patent No.: US 7,155,037 B2
(45) Date of Patent: Dec. 26, 2006

(54) FACE RECOGNITION APPARATUS

(75) Inventors: Takaaki Nagai, Wako (JP); Takahiro Ohhashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 299 days.

(21) Appl. No.: 09/796,346

(22) Filed: Mar. 2, 2001

(65) Prior Publication Data

US 2001/0019620 A1 Sep. 6, 2001

(30) Foreign Application Priority Data

Mar. 2, 2000 (JP) ............................ P2000-057835

(51) Int. Cl.
*G06K 9/00* (2006.01)

(52) U.S. Cl. ........................ 382/118; 382/103; 382/104

(58) Field of Classification Search ................ 382/103, 382/104, 118

See application file for complete search history.

(56) References Cited

U.S. PATENT DOCUMENTS

| 5,488,429 | A | * | 1/1996 | Kojima et al. | 348/653 |
| 5,864,363 | A | * | 1/1999 | Giefing et al. | 348/143 |
| 6,009,210 | A | * | 12/1999 | Kang | 382/276 |
| 6,144,755 | A | * | 11/2000 | Niyogi et al. | 382/118 |
| 6,263,113 | B1 | * | 7/2001 | Abdel-Mottaleb et al. | 382/237 |
| 6,466,685 | B1 | * | 10/2002 | Fukui et al. | 382/115 |
| 6,690,814 | B1 | * | 2/2004 | Yuasa et al. | 382/118 |
| 6,885,760 | B1 | * | 4/2005 | Yamada et al. | 382/118 |

* cited by examiner

*Primary Examiner*—Bhavesh M. Mehta
*Assistant Examiner*—Patrick Edwards

(57) ABSTRACT

The face recognition apparatus of the present invention comprises: a face recognizer; an image input section for receiving image data of a human face; a driver for changing at least one of a position and an angle of the image input section; a face direction detector for detecting the direction of the face in the image data; and a movement controller for controlling the driver based on the direction of the face detected by the face direction detector.

14 Claims, 10 Drawing Sheets

FIG. 5

| DISPLACEMENT ANGLE θ [deg.] | SKIN COLOR AREA RATIO [%] |
|---|---|
| 1 | 25 |
| 2 | 28 |
| ⋮ | ⋮ |
| 42 | 84 |
| 43 | 85 |
| 44 | 88 |
| 45 | 87 |
| 46 | 85 |
| ⋮ | ⋮ |
| 359 | 20 |
| 360 | 22 |

FACE RECOGNITION APPARATUS

BACKGROUND OF THE INVENTION

1. Field of the Invention

The present invention relates to a face recognition apparatus and method for recognizing a face to identify a person, to read an expression on the person's face, or to determine the condition of the person, and in particular, to a face recognition apparatus and method which improves the accuracy in recognizing the person by obtaining a full face image.

2. Description of the Related Art

As information technologies advance, man-machine interfaces, which users can easily operate, are increasingly in demand. Accordingly, the technology for identifying and verifying a user in the man-machine interface has become of increasing importance. There are various identification methods, e.g., a method using a storage medium which belongs only to the person (e.g., a magnetic card or an IC card), a method using matching of information which only he knows (e.g., a password), and a method using the features of the person's body. One of the methods using the features of the human body which identifies the person based on a digital image of his face has been developed.

This method is not limited to identification, but can recognize the expression of the user to determine the user's feelings. Thus, the technique for recognizing a human face has become important. For example, the method may be used to determine happiness, anger, and weariness, or to determine whether the person is an adult or a child.

In the method for recognizing a human face using digital image analysis, it is more difficult to identify the face, to detect its elements, and to extract the features of the face image as seen from the side, or obliquely from a high, low, right, or left angle, than as seen from directly in front of the full face. When receiving the image of the head just from behind or obliquely from behind, the image is of the back of the head, and the face cannot be recognized.

To improve the accuracy of recognition in the face recognition device of conventional techniques, the person needs to be directly in front of the image pick-up device. However, to improve the facility for users and compatibility with the machines so as to expand the application of the technique, it is not expedient that the person must take such an action.

BRIEF SUMMARY OF THE INVENTION

It is therefore an object of the present invention to provide a human face recognition apparatus for which a person need not move, turn, or pose when the face is being recognized, for which the person need not take any special action to face the machine, and which improves the accuracy of the human face recognition.

In the first aspect of the present invention, the face recognition apparatus comprises: a face recognizer; an image input section for receiving image data of a human face; a driver for changing at least one of a position and an angle of the image input section; a face direction detector for detecting the direction of the face in the image data; and a movement controller for controlling the driver based on the direction of the face detected by the face direction detector.

According to the first aspect of the present invention, the driver changes the position or direction of the image input section under the control of the movement controller. The movement section may move the entire face recognition apparatus, or may move only the image input section while the main body of the face recognition apparatus is fixed. While moving the image input section, images of the face at different angles are obtained. The full face image is determined from the images of the face at different angles, and is used to recognize the face, thereby providing accurate face recognition.

In the second aspect of the present invention, the movement controller directs the driver to move the image input section so that the ratio of the area of a specified color to the head in the image data is increased, the face direction detector detects a peak of the ratio, and the face recognizer recognizes the face based in the image data at the time of the peak.

According to the second aspect of the present invention, the movement controller directs the driver to change the position or angle of the image input section so that the ratio of the area of a skin color to a head in the image data is increased. The face direction detector detects the position at which the ratio of the area of the skin color to the head is maximum. The image whose ratio of the area of the skin color is maximum is determined as the full face image.

In the third aspect of the present invention, the face direction detector detects the image data on which the ratio of the area of a specified color to the head is maximum, and the face recognizer recognizes the face based on this image data.

According to the third aspect of the present invention, the movement controller directs the driver to change the position or angle of the image input section over a predetermined range. From the images input into the image input section as it moves, the face direction detector detects the position at which the ratio of the area of the skin color to the head is maximum. The image whose ratio of the area of the skin color is maximum is determined as the full face image.

In the fourth aspect of the present invention, the face direction detector detects the direction of the face based on the center of gravity of elements of the face in the image data.

The elements of the face are shapes in the image which can be recognized, such as the eyes, nose, mouth, eyebrows, or ears. The face direction detector can detect the direction of the face based on the relationship between the elements of the face and the outline of the face. Even when the direction of the face cannot be determined based only on the color information due to the condition of the hair, the apparatus can accurately detect the direction of the face.

In the fifth aspect of the present invention, the apparatus further comprises: a template image storage section for storing a template image of the face seen from a specified angle. The face direction detector detects the direction of the face based on correlation between the image data and the template image.

The directions of the face in the respective template images are known. Therefore, the face direction detector calculates the correlation between the input image and a plurality of template images, and specifies the template image with the highest correlation, thereby obtaining the direction of the face.

In the sixth aspect of the present invention, the apparatus further comprises: a plurality of face direction detectors using different processes for detecting the direction of the face. The face direction detectors are switched based on the condition of the detection of the direction of the face.

According to the sixth aspect of the present invention, the face direction detector chooses the method for detecting the face direction depending on the condition of the input image.

The condition of the image is, for example, the condition of the recognition of the head, the variation of the area of the skin color as the image input section moves, or the distribution of brightness over the image.

In the seventh aspect of the present invention, the method for recognizing a face comprises the steps of: detecting the direction of the face based on image data input into an image input section; changing at least one of a position and an angle of the image input section based on the detected direction of the face; determining a full face image based on the detected direction of the face; and recognizing the face based on the full face image.

In the eighth aspect of the present invention, the method for recognizing a face further comprises: detecting the direction of the face based on the ratio of the area of a specified color to the head in the image data; moving the image input section so that the ratio is increased; and detecting a peak of the ratio in order to determine the full face image.

In the ninth aspect of the present invention, the method for recognizing a face further comprises the steps of: calculating the ratio of the area of a specified color to the head in the image data; determining the image data on which the ratio of the area of a specified color to the head is maximum; and recognizing the face based on the determined image data.

In the tenth aspect of the present invention, the method for recognizing a face further comprises the step of detecting the direction of the face based on the center of gravity of elements of the face in the image data.

In the eleventh aspect of the present invention, the method for recognizing a face further comprises the steps of: storing a template image of the face seen from a specified angle; and detecting the direction of the face based on correlation between the image data and the template image.

In the twelfth aspect of the present invention, the method for recognizing a face further comprises the step of switching among a plurality of different face direction processes for detecting the direction of the face based on the condition of the detection of the direction of the face.

The first and seventh aspects of the present invention can determine the direction of the face based on the input image data. The apparatus moves to the position for naturally communicating with the person and recognizes the face of the person. Therefore, the present invention is familiar with the user and is easy to handle. The process for recognizing the face selects the full face image, thereby improving the accuracy in recognizing the face. The face recognition apparatus moves the image input section to pick up images at different angles to obtain the full face image. Therefore, the person does not have to change his or her position or angle in order to face the image input section.

The second and eighth aspects of the present invention detect the skin color of the face, and move the image input section so that the area of the skin color is increased. Therefore, the time for obtaining the full face image is shortened. The third and ninth aspects of the present invention move the image input section around the person to obtain images from all directions (covering a predetermined range), detect the skin color of the face, and use the image in which the ratio of the area of the skin color is maximum. Thus, the full face image can be reliably obtained.

The fourth and tenth aspects of the present invention detect the direction of the face based on the center of gravity of the elements of the face in the image. Therefore, even when an object covers a part of the face, or even when the direction of the face cannot be determined based only on the color information due to the condition of the hair, the present invention can accurately detect the direction of the face.

The fifth and eleventh aspects of the present invention store images of the face from different angles as template images, and detect the direction of the face based on the correlation between the input image and the template images. Therefore, even when the direction of the face cannot be determined based only on the color information due to the condition of the hair, the present invention can accurately detect the direction of the face.

The sixth and twelfth aspects of the present invention switch the method for detecting the direction of the face depending on the condition of the input image. Therefore, the full face image can be reliably obtained according to the circumstances.

BRIEF DESCRIPTION OF THE DRAWINGS

FIG. 5 is a table showing the data structure which represents the relationship between the displacement angle, and the area of the skin color for detecting the direction of the face according to the face recognition apparatus of the present invention.

DETAILED DESCRIPTION OF THE INVENTION

Figure 1:
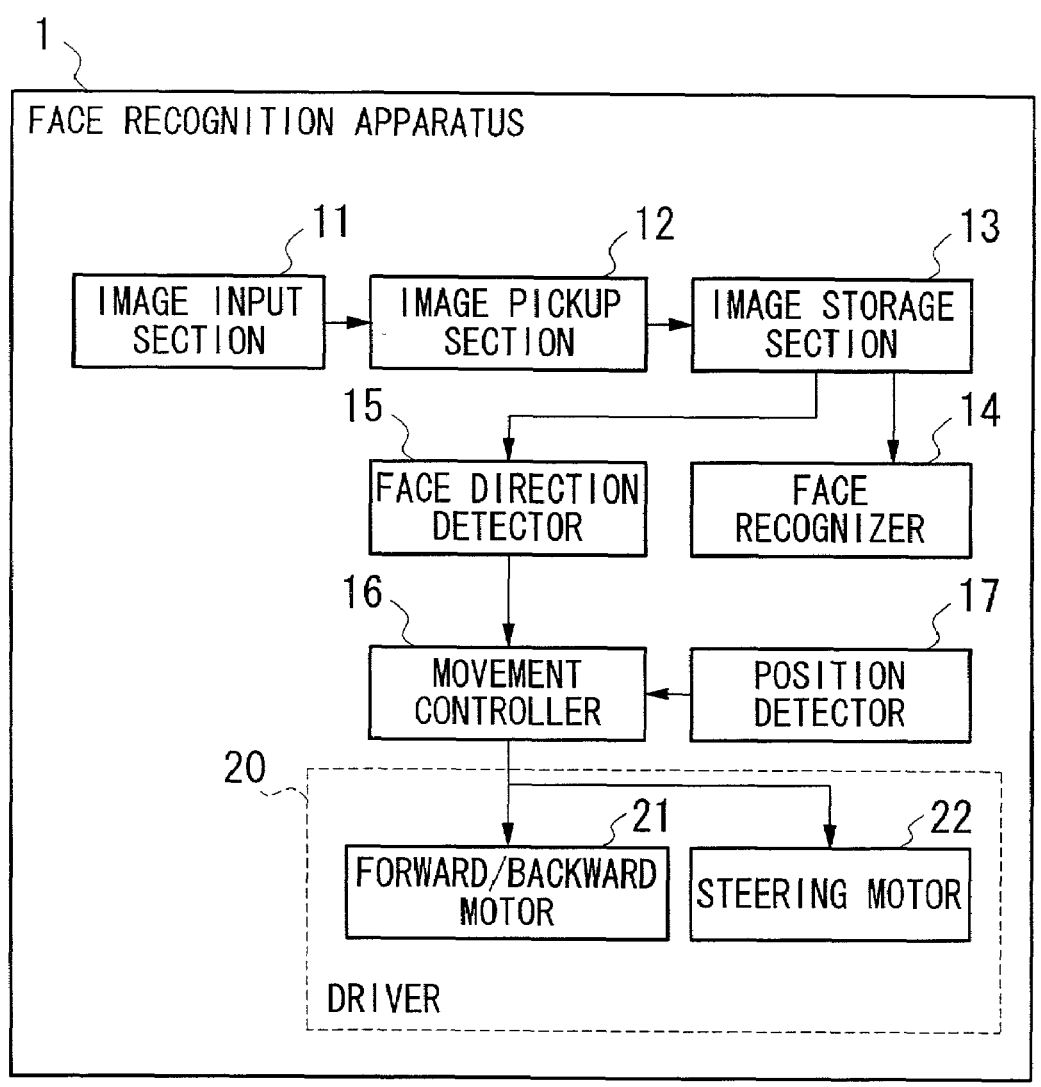
FIG. 1 is a block diagram showing the structure of the face recognition apparatus of the present invention.

The embodiment of the present invention will be explained with reference to the drawings. FIG. 1 is a block diagram showing the structure or functions of the face recognition apparatus of the embodiment. In FIG. 1, the face recognition apparatus comprises an image input section 11, an image pickup section 12, an image storage section 13, a face recognizer 14, a face direction detector 15, a movement controller 16, a position detector 17, and a driver 20.

The image input section 11 converts the optical image obtained through a condenser such as a lens into an electric signal. The image pickup section 12 performs quantization and data compression of the electric signal output from the image input section 11, and converts the signal into image data which can be digitally processed. The image storage section 13 stores the image data converted by the image pickup section 12. The image data stored in the image storage section 13 can be read if necessary. The face direction detector 15 reads the image data stored in the image storage section 13, detects the face contained in the image, and analyzes it to detect the direction of the face with respect to the image pick-up element. This detection by the face direction detector 15 will be described below.

The position detector 17 detects the position and direction of the face recognition apparatus 1 in a three dimensional space, or of the image input device 11 provided in the face recognition apparatus 1. There are various methods for detecting the position, which can be employed in the position detector 17, such as: a method using encoders provided in a forward/backward drive motor 21 and a steering motor 22 for measuring their amounts of movement; a method for determining the position based on marks on fixed objects (a floor, a pillar, a ceiling, etc.) detected by a physical, electrical, or optical method; a method for determining the position based on the direction of the source of transmitted radio, light, or sound waves; a method for determining the position based on the difference between the time of receiving a signal, such as radio waves, and a reference time; or a method using a gyro. For example, the method for receiving radio waves may use a GPS (Global Positioning System).

The movement controller 16 controls the driver 20 to change the position and direction of the image input section 11 based on the direction of the face detected by the face direction detector 15 and on the position detected by the position detector 17, or based on another original moving means. The driver 20 comprises a forward/backward drive motor 21, and a steering motor 22 which drive wheels in order to change the position and direction of the face recognition apparatus 1.

Figure 2:
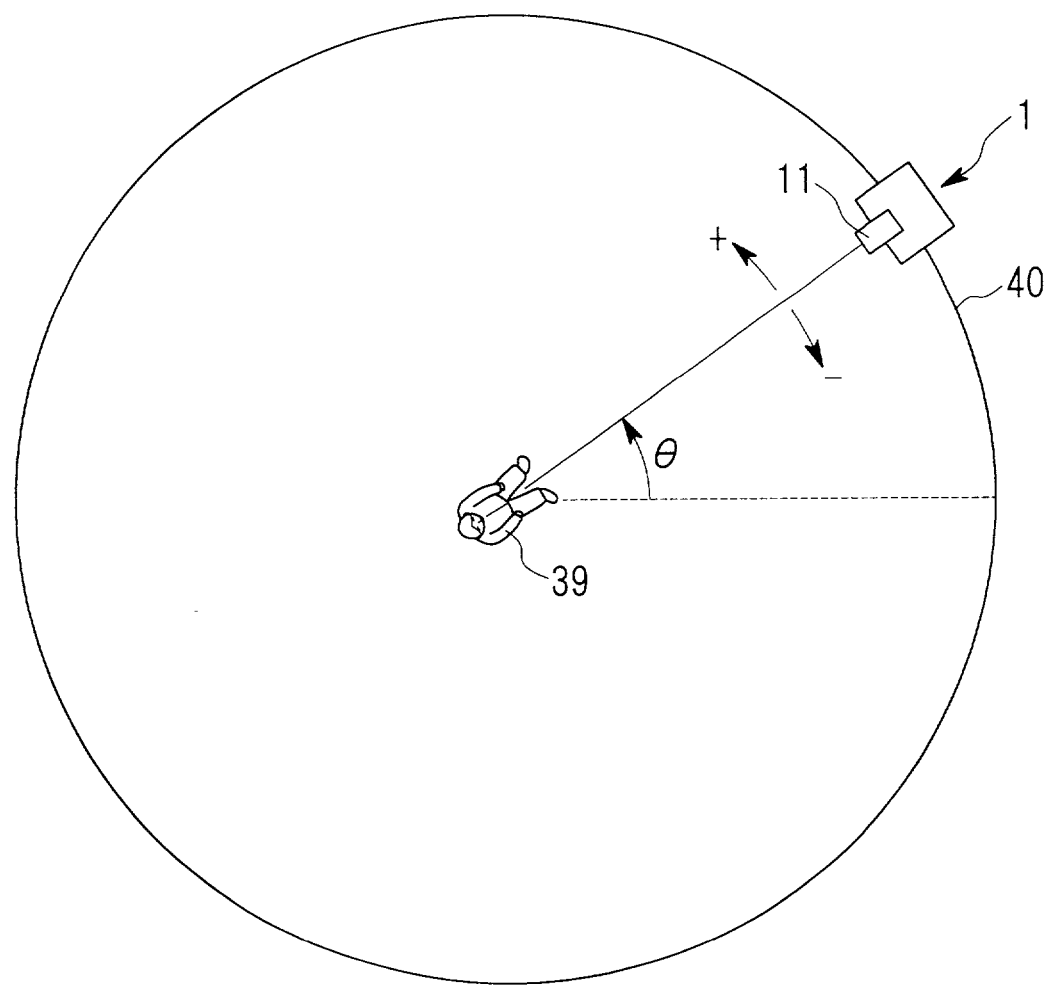
FIG. 2 is a plan view showing the position, movable range, and moving direction of the face recognition apparatus of the present invention.

The operation for moving the face recognition apparatus 1 will now be explained. FIG. 2 is a plan view showing the positional relationship between the person who is the target to be recognized and the face recognition apparatus 1. In FIG. 2, the image pick-up surface of the image input section 11 provided in the face recognition apparatus 1 faces the person 39. The face recognition apparatus 1 can move on a circumference 40 with the person 39 at the center by means of the driver 20. Specifically, the apparatus moves on the rail provided on the circumference 40. As shown in FIG. 2, the position of the face recognition apparatus is represented by a displacement angle θ from the initial position with respect to the person 39 as the center. In the top view, a counter-clockwise movement on the circumference 40 is represented as "+", while a clockwise movement is represented as "−".

Figure 3:
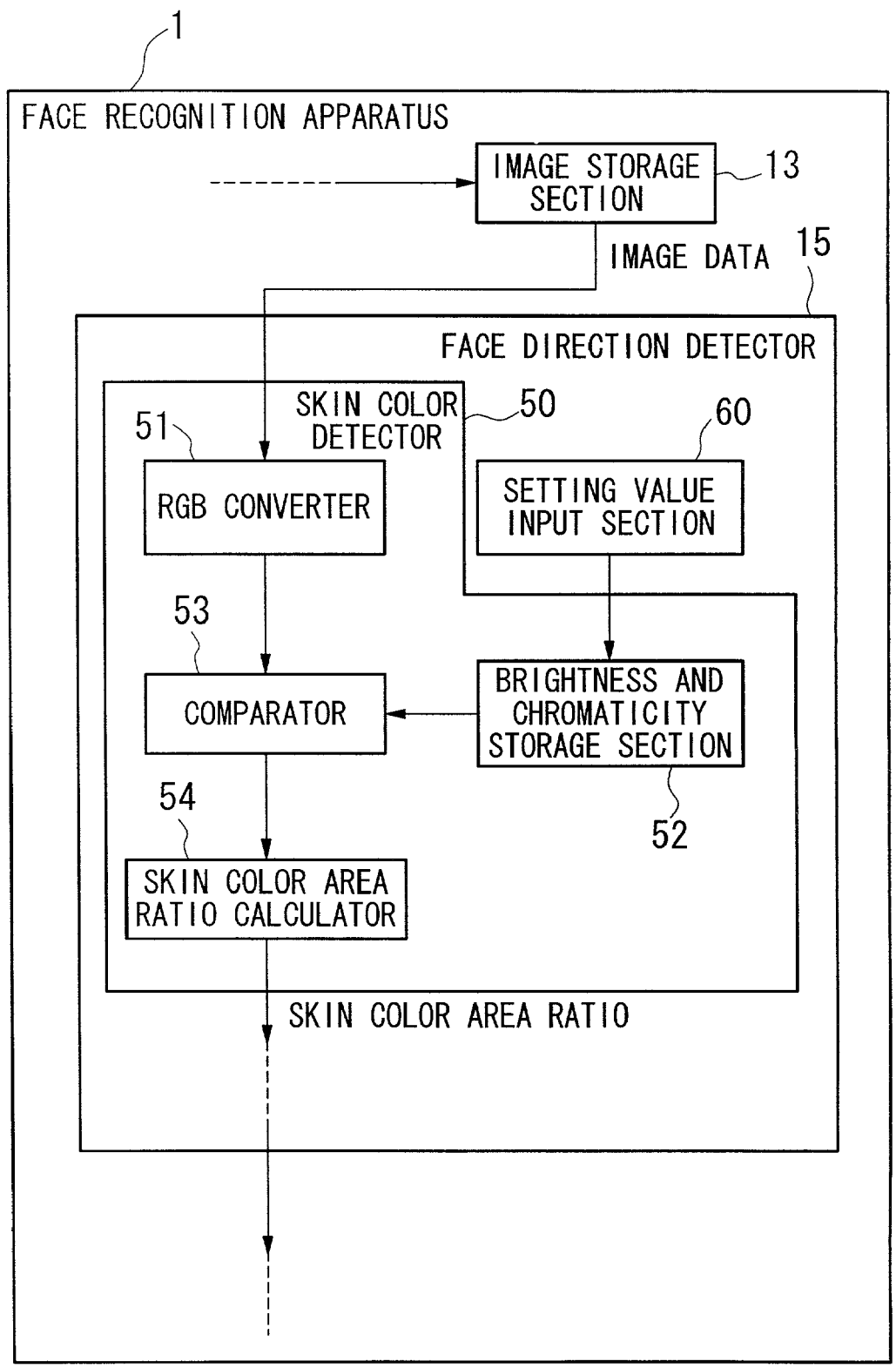
FIG. 3 is a block diagram showing the face direction detector of the face recognition apparatus of the present invention.

The face direction detector in the face recognition apparatus detects the direction of the face based on the area of skin color in the input image. FIG. 3 is a block diagram showing the details of the functions of the face direction detector 15. As shown in FIG. 3, the face direction detector 15 has a skin color detector 50 comprising an RGB converter 51, a brightness and chromaticity storage section 52, a comparator 53, and a skin color area ratio calculator 54.

Because a face, which is a three-dimensional object, may be unevenly illuminated depending on the conditions of the illumination, even areas of the same color does not have the same or fixed RGB value. Therefore, brightness and chromaticity are separated by the following conversion process for the input image data. The range of the brightness of the head of the person, and the range of the chromaticity of the skin are predetermined. Out of all the pixels in the image data, the number of pixels within both the ranges is obtained in order to calculate the area of the skin. Since the optimized values of the brightness and chromaticity change depending on the environment in which the face recognition apparatus is operated, the values can be adjusted depending on the circumstances. The range of the brightness and the range of chromaticity are separately adjusted. For example, the range of brightness may be set to be narrow so that the apparatus does not recognize an area other than the skin, and the range of the chromaticity may be set to be wide so as to eliminate the effects due to shadows.

The RGB converter 51 extracts the brightness and chromaticity separately by the following conversion process for the image data read from the image storage section 13. The brightness L of each pixel is represented by:

$$L=(R'+G'+B')/3$$

The chromaticity values r, g, and b are represented by:

$$r=63R'/(R'+G'+B')$$

$$g=63G'/(R'+G'+B')$$

$$b=63B'/(R'+G'+B')$$

If γ is a characteristic value on a curved line which represents the sensitivity of the image input section, and if its reciprocal is γ', then R', G', and B' are represented by:

$$a=63^{(1-\gamma')}$$

$$R'=aR^{\gamma'}$$

$$G'=aG^{\gamma'}$$

$$B'=aB^{\gamma'}$$

The setting values of the brightness and chromaticity of the skin color are input into the setting value input section 60 and are stored in the brightness and chromaticity storage section 52. The comparator 53 compares the brightness and chromaticity output from the RGB converter 51 with the values of the skin color stored in the brightness and chromaticity storage section 52, and then determines whether the pixel corresponds to the skin color. The skin color area ratio calculator 54 calculates the ratio of the skin color area based on the determination of the comparator 53, and then outputs the calculated value.

The area used to detect the direction of the face is not an area in the input image, but an actual area obtained by parallel projection. As a special case, when the distance between the target face and the image input section is fixed, the area in the image, or the number of pixels, may be used to measure the area of the head or the area of the skin color. In general, as the distance between the target face and the image input section varies, the area of the face in the image varies. Therefore, the area in the image must be corrected in consideration of the variation in distance, or the ratio of the area of the skin color to the area of the head in the image may be considered.

In order to simplify the explanation, it is assumed that the head of the person whose image is picked up is adjusted so as to be at the center of the image, and to a predetermined size and position in the image. The ratio of the area of the skin color to the area of the head is calculated based on the adjusted image.

Figure 4:
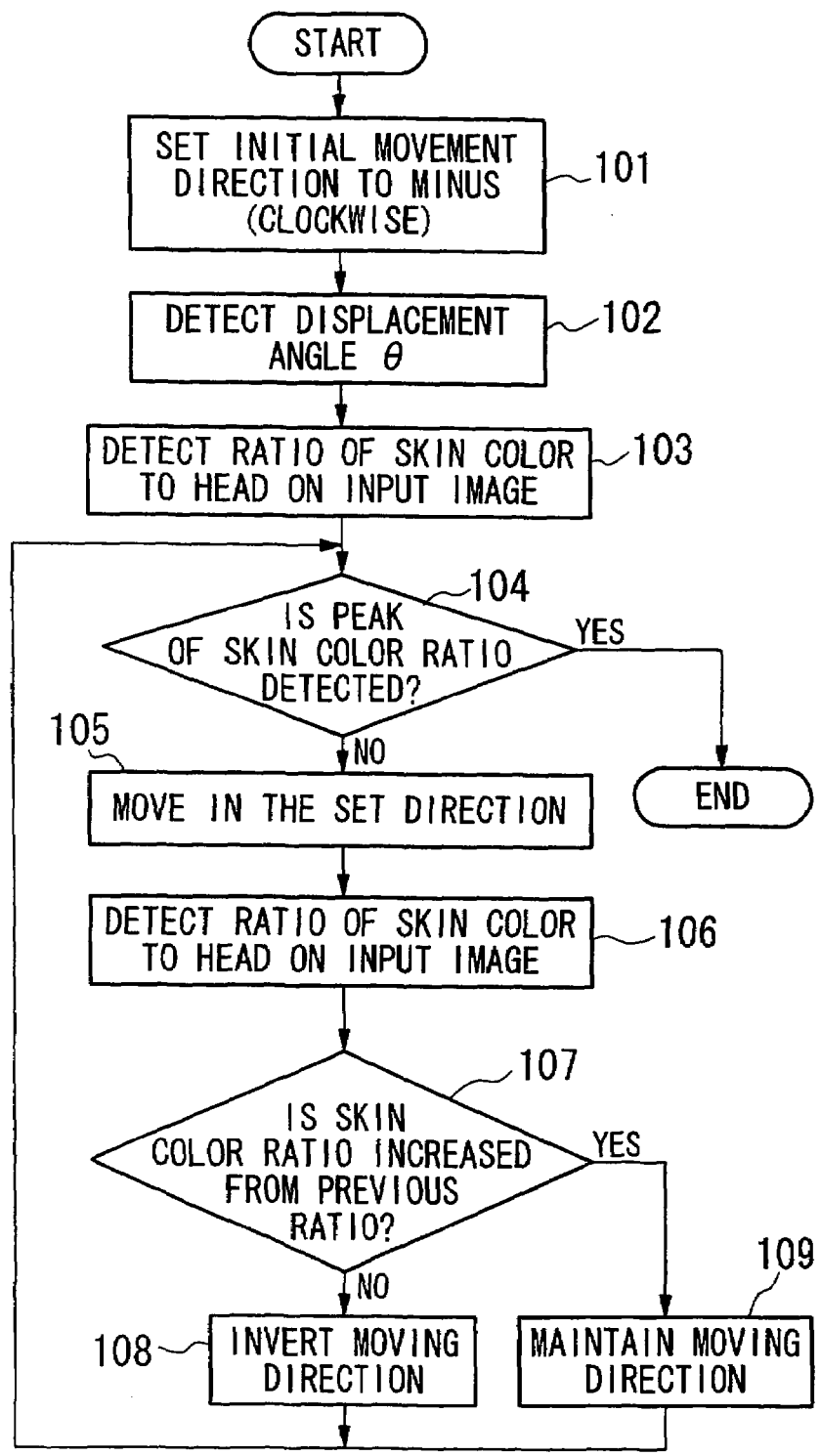
FIG. 4 is a flowchart showing the procedure for detecting the face according to the face recognition apparatus of the present invention.

The procedure for recognizing a human face with the face recognition apparatus will now be explained. FIG. 4 is a flowchart showing the first procedure of the face recognition apparatus for recognizing a human face. In this procedure, the face recognition apparatus moves on the circumference as shown in FIG. 2.

In the procedure in FIG. 4, the face recognition apparatus sets the initial value of the direction of movement to the minus direction, that is, to the clockwise direction (step 101). Then, the face recognition apparatus detects the displacement angle θ which represents its position (step 102). Then, the area of the skin color of the head (skin color area value) in the input image received by the image input section is detected (step 103). Although it is then determined whether the peak of the ratio of the area of the skin color has been detected (step 104), the determination is "NO" since there is no peak at the time of the first execution of step 104.

The apparatus then moves in the set direction by a predetermined distance (step 105), and detects the area of the skin color in the input image at the new position (step 106). Then, the newly detected area of the skin color is compared with the previous area of the skin color (step 107). If the area of the skin color does not increase, the direction of the movement is switched to the reverse direction (step 108). If the area of the skin color increases, the direction of movement is not changed (step 109). Then, steps 104 to 109 are repeated.

In step 104, the peak of the ratio of the area of the skin color is detected by a gradient method. When detecting the peak of the area of the skin color, the apparatus determines that this position is directly in front of the face of the person and stops moving. The image data received at that position is sent to the face recognizer 14, and the face recognizer 14 accurately recognizes the human face based on the full face image.

The apparatus may use a GA (Genetic Algorithm) method to obtain the full face image while receiving the image at displaced positions.

The second procedure of the face recognition apparatus will now be explained. In this second procedure, the face recognition apparatus moves on the circumference as shown in FIG. 2. While repeatedly moving from the initial position by a predetermined distance, the face recognition apparatus receives an image at each position, calculates the ratio of the area of the skin color in the image according to the above-described method, and records pairs of the ratio and the position. FIG. 5 is a table showing the structure of the recorded data. In this embodiment, the face recognition apparatus picks up an image every one degree of the displacement angle, and records the ratios of the area of the skin color of 360 input images, from one degree to 360 degrees. In the data shown in FIG. 5, the ratio of the area of the skin color reaches a maximum value of 88% at a position of 44 degrees. Therefore, the position of 44 degrees is determined as the position directly in front of the face, and the image data received at that position is sent to the face recognizer 14. The face recognizer 14 recognizes the face based on the sent full face image.

The ratios of the area of the skin color at the respective angles frequently include errors. Therefore, a filtering process for smoothing the value which vary with the displacement angle may be conducted, and then the maximum ratio of the area of the skin color may be determined.

Figure 6:
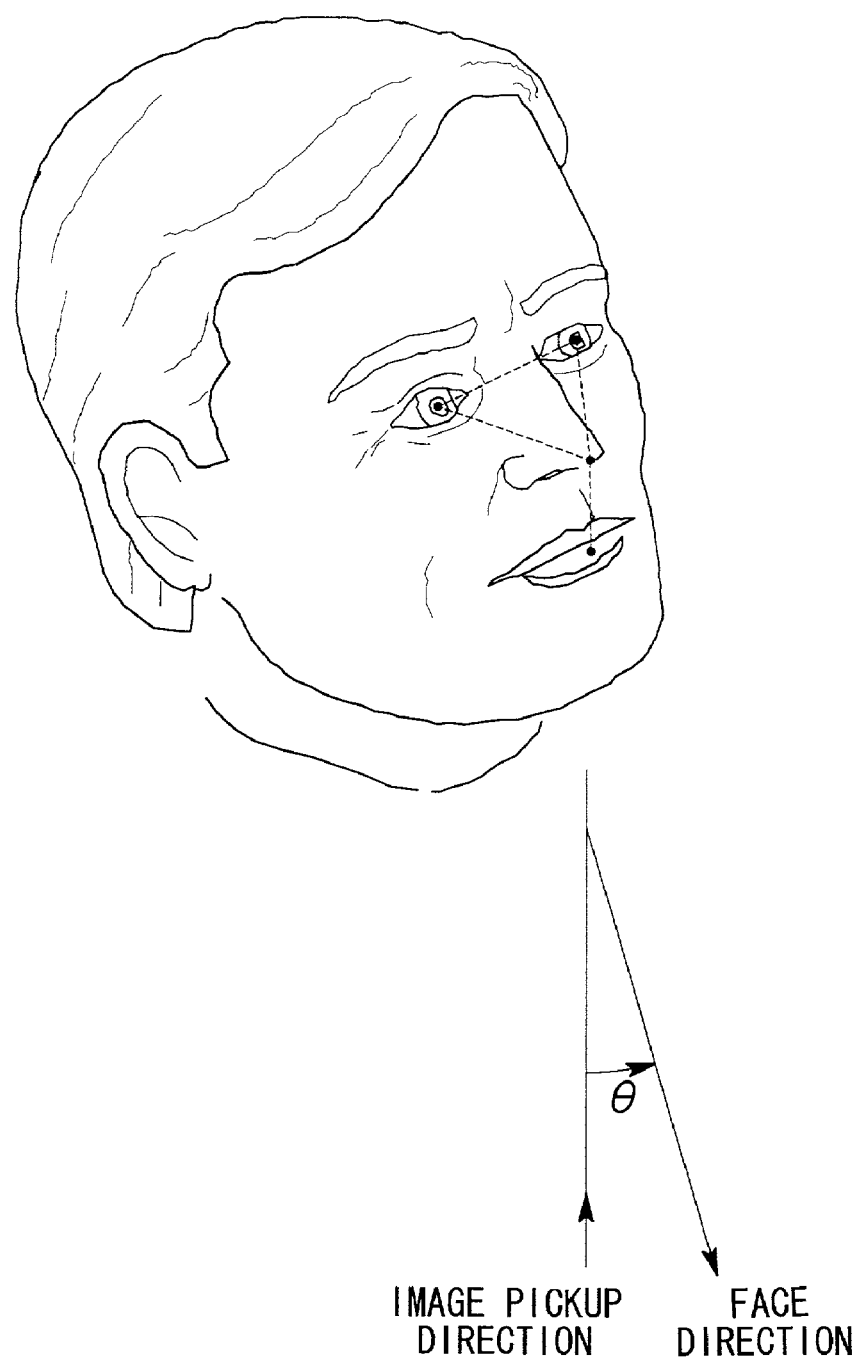
FIG. 6 is a reference diagram showing the principle for detecting the direction of the face based on the positional relationship between the structural elements of the face according to the face recognition apparatus of the present invention.

The third procedure for recognizing the human face with the face recognition apparatus will now be explained. In this third procedure, the input image data is analyzed in order to extract the elements of the face such as the eyes, nose, and mouth. The direction of the face is determined based on the positions of the elements, and the distance of movement is calculated based on the direction of the face. FIG. 6 shows the principle of this method for detecting the direction of the face. The outline and the elements of the face are extracted from the input image data by an edge filtering process and a template matching process, and the direction of the face with respect to the image pickup element is calculated from the relationships between the positions of the outline and the elements. Specifically, the direction of the face is calculated from the differences between the center of gravity of the outline on a plane image and the centers of gravity of the eyes, the nose, and the mouth.

Figure 7:
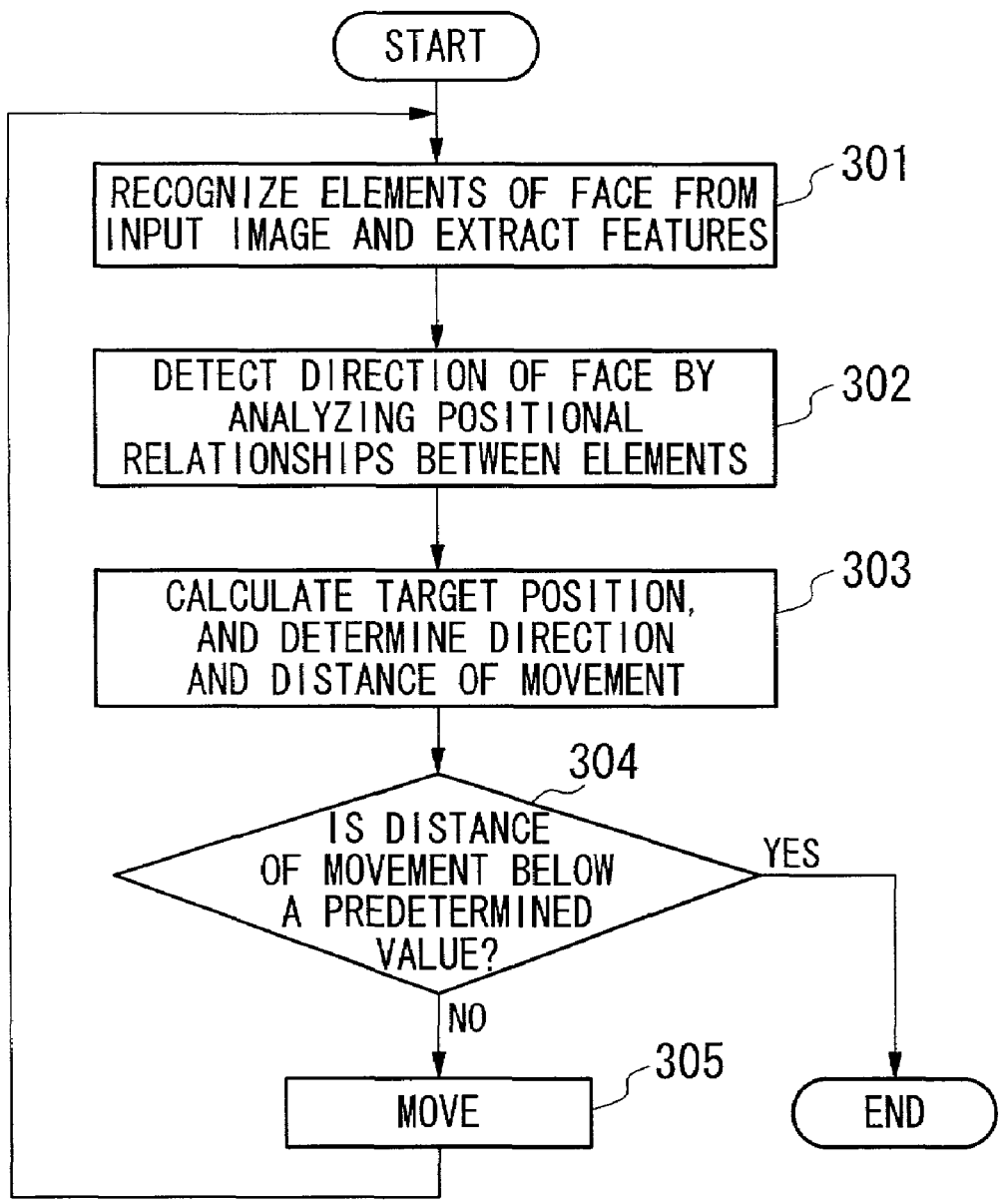
FIG. 7 is a flowchart showing the procedure for moving the face recognition apparatus directly in front of the face based on the direction of the face which has been detected based on the positional relationship between the structural elements of the face according to the face recognition apparatus of the present invention.

FIG. 7 is a flowchart showing the procedure for recognizing the face using the above-described process for detecting the direction of the face based on the elements of the face. First, the elements of the face in the input image are recognized, and the features are extracted (step 301). Then, the positional relationships between the elements of the face are analyzed to detect the direction of the face (step 302). Then, the target position for obtaining the full face image is calculated from the detected direction of the face, and the direction and the distance to be moved are determined (step 303). When the distance to be moved is less than a predetermined value, then it is determined that the full face image has been obtained (step 304). The accuracy in detecting the full face image can be increased by appropriately setting the predetermined value in step 304. The predetermined value is preset to prevent hunting which occurs when the predetermined value is too small. When the distance to be moved is greater than the predetermined value, the apparatus moves (step 305), and the process following step 301 is repeated. In step 304, if the distance to be moved is less than the predetermined value, then the apparatus does not move, and the image data picked up at that position is sent to the face recognizer 14, which then recognizes the face. Even when problems due to color or presence of hair arise in detecting the direction of the face based on the ratio of the area of the skin color to the area of the head, the direction of the face can be detected according to the above-described method.

Figures 11A, 11B, 11C, 11D, 11E:
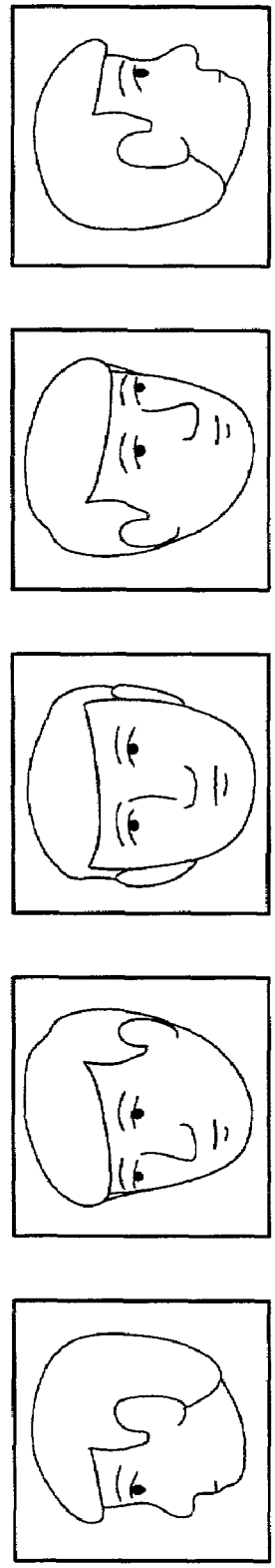
FIGS. 11A to 11E are diagrams showing template face images.

The fourth procedure of the face recognition apparatus for recognizing a human face will now be explained. The fourth procedure uses a template image in a specified face direction. FIGS. 11A to 11E are diagrams showing examples of template images at different angles. The images shown in FIGS. 11A to 11E are template images from angles of +90 degrees (FIG. 11A), +45 degrees (FIG. 11B), 0 degrees (FIG. 11C), −45 degrees (FIG. 11D), and −90 degrees (FIG. 11E). These template images are stored in the image storage section (template image storage section). The direction of the face of the input image is determined based on the correlation between the image input from the image input section and the template images. This template matching method may be combined with a gradient method or a GA method in order to obtain the full face image.

Additionally, the full face image can be determined when an area of a hair color (black, brown, blonde, or red) exists on both sides of the face in the input image.

The number of angles is not limited to five as shown in FIG. 11, and more images at a greater number of angles at finer intervals may be used to increase the accuracy. The images need not be of a single person, but template images of a plurality of persons may be prepared to cover a wide range of features. Further, the template matching process may use an average face image whose features are the averages of a plurality of sample face images. Further, a template image produced by a mosaic process or a smoothing process may be used.

While the first to fourth procedures for accurately recognizing the face based on the full face image by moving the apparatus are described, these methods may be switched depending on the condition of the obtained face image, or on the condition of the detection of the face direction. The condition of the detection of the face direction is, for example, the sharpness of the peak of the skin color depending on the angle at which the image is picked up, the accuracy in detecting the structural elements of the face, or the matching accuracy in the template matching process.

Figure 8A:
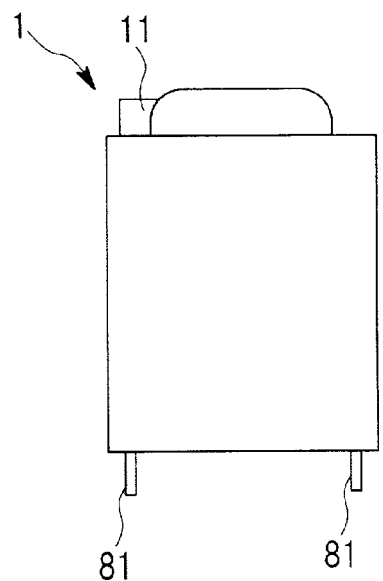
FIG. 8A is a side view of the face recognition apparatus of the present invention.
Figure 8B:
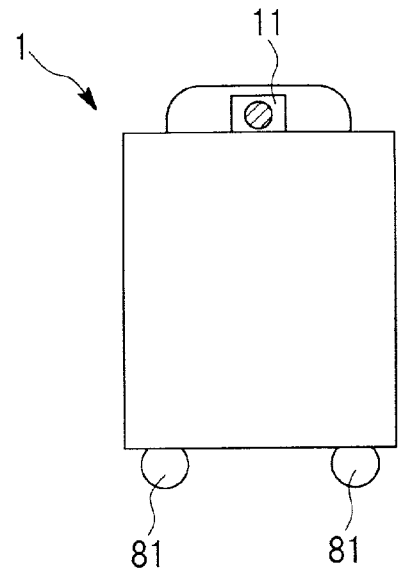
FIG. 8B is a front view of the face recognition apparatus of the present invention.

The section for moving the image input section will now be explained. FIG. 8A is a side view of a robot with the face recognition apparatus, and FIG. 8B is a front view of the robot with the face recognition apparatus. As shown in FIG. 8, a plurality of wheels 81 are provided in the face recognition apparatus 1, and are driven by the driver. Thus, since the face recognition apparatus 1 can move, the image input section 11 of the face recognition apparatus 1 also moves.

Figure 9A:
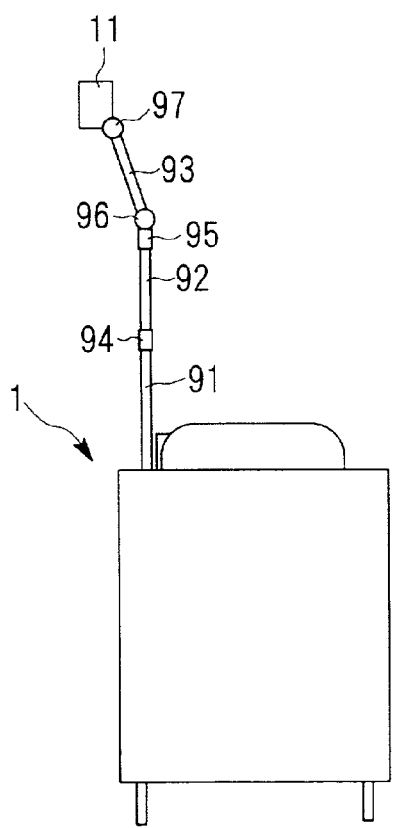
FIG. 9A is a side view showing the face recognition apparatus of the present invention.
Figure 9B:
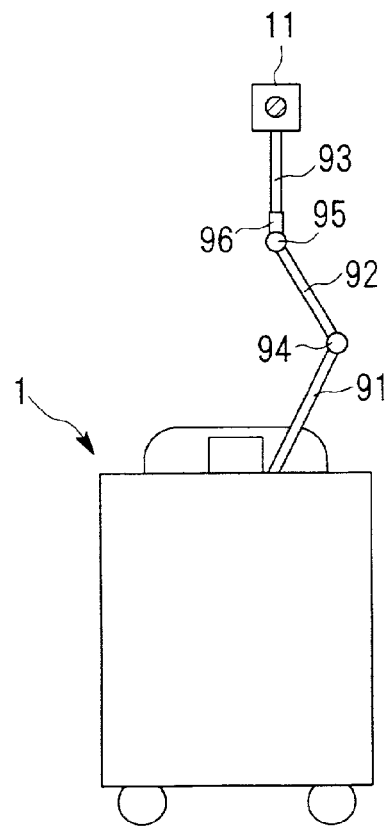
FIG. 9B is a front view showing the face recognition apparatus of the present invention

FIG. 9A is a side view showing another embodiment of a robot with the face recognition apparatus and the unit for moving the image input section, and FIG. 9B is its front view. In FIG. 9, the image input section 11 is attached to the end of a multiple-joint arm which comprises arms 91 to 93 for moving the image input section, and joints 94 to 97 for changing the angle of the image input section. The driver drives the multiple-joint arm under the control of the movement controller to change the position and angle of the image input section 11 within the range of the arm. The face recognition apparatus shown in FIG. 9 has wheels, by which the position of the face recognition apparatus 1 and the position of the image input section 11 are moved.

Figure 10:
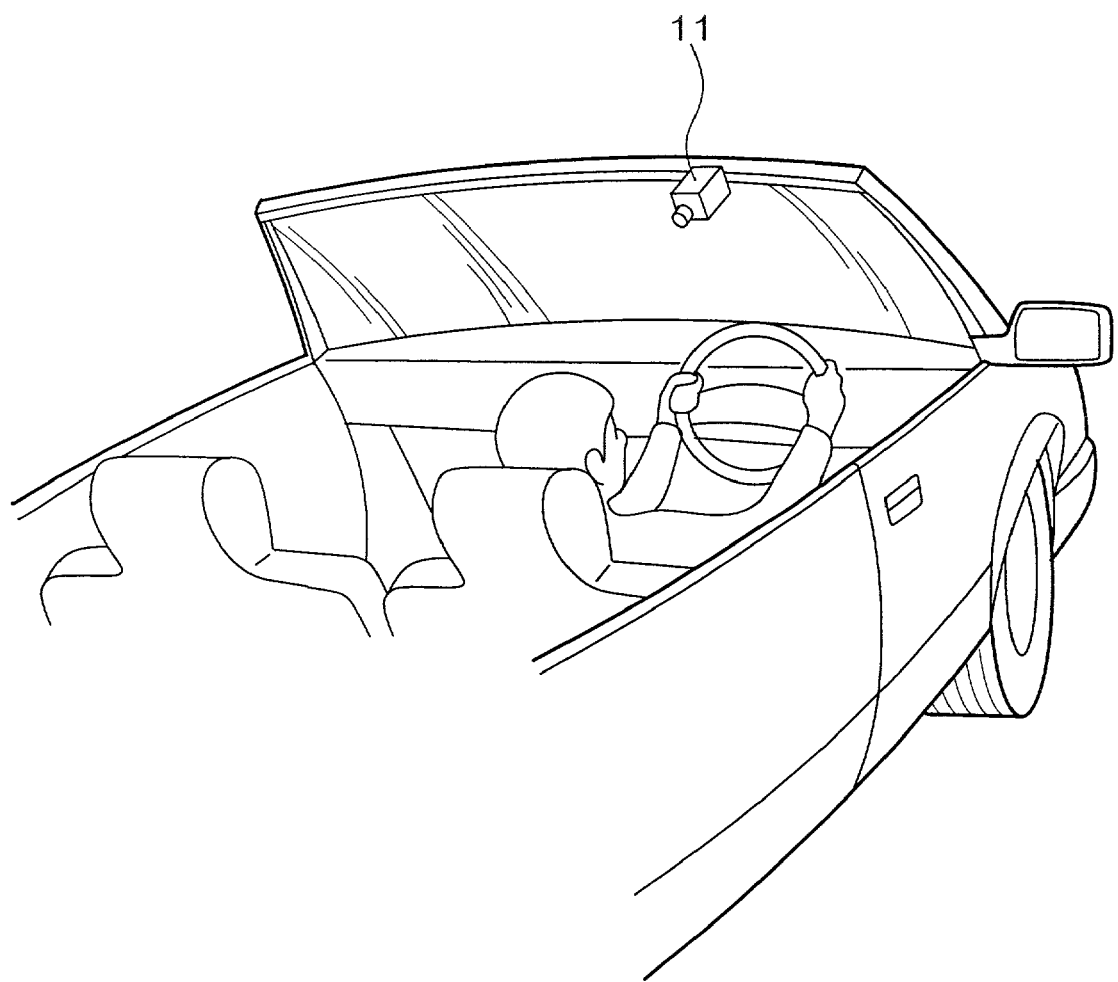
FIG. 10 is a reference diagram showing a car in which the face recognition apparatus of the present invention is provided.

FIG. 10 is a diagram showing a driver recognition apparatus provided near a driver's seat in a car with the image input section 11. The image input section 11 moves on a rail provided on the ceiling of the car, and can pick up the image of the face of the driver at any angle within a predetermined range. Therefore, even when the position or the angle of the face of the driver is changed, the image input section 11 can follow the movement. Since the image input section 11 can receive not only visible light but also infrared light, the image input section 11 can pick up the image of the face of the driver even when driving at night or in a tunnel. The face direction detector, which is not shown in FIG. 10, detects the direction of the driver's face, and the face recognizer, not shown, recognizes the face based on the obtained image data. Thus, when the face recognition apparatus of the present invention is provided in the car, the driver can be identified based on his or her face, and the extent to which the driver is weary or awake may be judged based on his or her expression. The person whose face is to be recognized is not limited to the driver, and may be a passenger.

The means for moving the image input section 11 is not limited to wheels and an arm. Other examples which may be used are, a walking mechanism with two legs, a walking mechanism with four legs, other mechanisms with multiple legs, a caterpillar mechanism, or a floating mechanism.

The above embodiments are operated under the assumption that the image of the head is always received by the image input section. Even when the image of the head is not received by the image input section, the face recognition apparatus may move to a position where the apparatus can recognize the face, may then determine the area of the head, and may then move the image input section. The face recognition apparatus may receive spoken sound from the person using two stereo microphones, and then determine the full face image based on the difference in sound pressure between the two stereo microphones. The face recognition apparatus may produce a sound directed toward the person so that the person turns toward the apparatus, and the full face image can thus be obtained.

The face recognition apparatus with the moving means may be provided as a robot, such as a human-type robot, a pet-type robot, or a self-controlled robot. The robot can move around the person and can naturally communicate with the person at that position. Further, the robot can receives the full face image, thereby increasing the accuracy in identifying the face. Additionally, the robot could be programmed to obey a specified person, for example.

The face recognition apparatus may have an internal computer. All or part of the processes for receiving the image, detecting the face direction, controlling the movement, and recognizing the face may be stored in a storage medium in the computer system in the form of a computer program. The computer reads and executes the program to carry out the above processes. The storage medium in the computer system is, for example, a floppy disk, an optical magnetic disk, a CD-ROM, a magnetic hard disk, or a semiconductor memory.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

The invention claimed is:

1. A face recognition apparatus comprising:
    a face recognizer;
    an image input section for receiving image data;
    a face direction detector for detecting whether a face is within the image data received and for detecting a direction of the face, when the face is detected, through separation of a first brightness and chromaticity of the received image data and comparison of the first brightness and chromaticity with a preset second brightness and chromaticity;
    a driver for changing at least one of a position and an angle of the image input section such that the face direction detector calculates the direction of the face, when the face is detected, from a plurality of received image data based on a peak value of a ratio of an area of a specified color of the face to an area of a head in the image data; and
    a movement controller for controlling the driver based on whether the face is detected and based on the direction of the face when the face is detected, until a face is detected,
    wherein the movement controller directs the driver to move the image input section so that the ratio of the area of the specified color of the face to the area of the head in the image data increases.

2. A face recognition apparatus according to claim 1, wherein the face direction detector detects the image data in which the ratio of the area of the specified color of the detected face to the area of the head in the image data is maximum, and the face recognizer recognizes the detected face based on the image data.

3. A face recognition apparatus according to claim 1, wherein the face direction detector detects the direction of the face based on a center of gravity of elements of the face in the image data.

4. A face recognition apparatus according to claim 1, further comprising:
a template image storage section for storing a template image of the face seen from a specified angle, wherein the face direction detector detects the direction of the face based on a correlation between the image data and the template image.

5. A face recognition apparatus according to claim 1, in which, when the peak value of the ratio of the area of the specified color of the face to the area of the head in the image data is detected, the apparatus determines that a full face is acquired in the image data.

6. A face recognition apparatus according to claim 1, in which, when the peak value of the ratio of the area of the specified color of the face to the area of the head in the image data is detected, the apparatus determines that the image input section is directly in front of the face and the controller directs the driver to stop moving the image input section.

7. A face recognition apparatus, comprising:
a face recognizer;
an image input section for receiving image data of a human face;
a driver for changing at least one of a position and an angle of the image input section; and
a plurality of face direction detectors for detecting the direction of the face, wherein each of the face direction detectors calculates the direction of the face from a plurality of received image data, and uses a different process for detecting the direction of the face, wherein one of the face direction detectors detects the direction of the face based on a peak value of a ratio of an area of a specified color of the face to an area of a head in the image data, and wherein the face direction detectors are switched based on a condition of the detection of the direction of the face or a condition of the face image.

8. A method for recognizing a face, comprising the steps of:
detecting whether a face is within image data input into an image input section, and detecting a direction of the face through separation of a first brightness and chromaticity of received image data and comparison of the first brightness and chromaticity with a preset second brightness and chromaticity when the face is detected;
changing at least one of a position and an angle of the image input section based on the detected direction of the face, such that the direction of the face is calculated from a plurality of received image data based on a peak value of a ratio of an area of a specified color of the face to an area of a head in the image data;
moving the image input section so that the ratio increases;
detecting the peak value of the ratio in order to determine the full face image;
determining the full face image based on the detected direction of the face; and
recognizing the face based on the full face image.

9. A method for recognizing a face according to claim 8, further comprising the steps of:
calculating a ratio of an area of a specified color of the face relative to an area of the face in the image data;
determining the image data in which the ratio of the area of the specified color of the face to the area of the head in the image data is maximum; and
recognizing the face based on the determined image data.

10. A method for recognizing a face according to claim 8, further comprising the step of:
detecting the direction of the face based on a center of gravity of elements of the face in the image data.

11. A method for recognizing a face according to claim 8, further comprising the steps of:
storing a template image of the face seen from a specified angle; and
detecting the direction of the face based on a correlation between the image data and the template image.

12. A method for recognizing a face comprising the steps of:
detecting a direction of the face based on image data input into an image input section, and through separation of a first brightness and chromaticity of received image data and comparison of the first brightness and chromaticity with a preset second brightness and chromaticity;
switching among a plurality of different face direction processes for detecting the direction of the face based on a condition of the detection of the direction of the face or a condition of the face image;
changing at least one of a position and an angle of an image input section based on the detected direction of the face such that the direction of the face is calculated from a plurality of received image data based on a ratio of an area of a specified color of the face to an area of a head in the image data;
determining the full face image based on the detected direction of the face; and
recognizing the face based on the full face image.

13. A robot comprising:
a face recognition apparatus including:
an image input section for receiving image data of a human face;
a driver for changing at least one of a position and an angle of the image input section;
a plurality of face direction detectors using different processes for detecting a direction of the face, including separation of a first brightness and chromaticity of received image data and comparison of the first brightness and chromaticity with a preset second brightness and chromaticity, and calculation of the direction of the face from a plurality of received image data based on a peak value of a ratio of an area of a specified color of the face to an area of a head in the image data, wherein the face direction detectors are switched based on a condition of the detection of the direction of the face or a condition of the face image; and
a movement controller for controlling the driver based on the direction of the face detected by the face direction detector so that the ratio of the area of the specified color of the face to the area of the head in the image data increases.

14. A driver recognition apparatus for recognizing a driver in a vehicle comprising:
a face recognition apparatus including:
an image input section for receiving image data of a vehicle driver's face;
a position changing driver for changing at least one of a position and an angle of the image input section;
a plurality of face direction detectors using different processes for detecting the direction of the face, including separation of a first brightness and chromaticity of received image data and comparison of the first brightness and chromaticity with a preset second brightness and chromaticity, and calculation of the direction of the face from a plurality of received image data based on a peak value of a ratio of an area of a specified color of the face to an area of a head in the image data, wherein the face direction detectors are switched based on a condition of the detection of the direction of the face or a condition of the face image; and a movement controller for controlling the position changing driver based on the direction of the face detected by the face direction detector so that the ratio of the area of the specified color of the face to the area of the head in the image data increases.

* * * * *